United States Patent
Li et al.

(10) Patent No.: US 9,521,569 B2
(45) Date of Patent: Dec. 13, 2016

(54) FAULT DIAGNOSIS METHOD AND APPARATUS

(71) Applicant: Huawei Technologies Co., Ltd., Shenzhen (CN)

(72) Inventors: Ying Li, Shenzhen (CN); Jianjun Qiu, Shenzhen (CN); Peng Wu, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 124 days.

(21) Appl. No.: 14/567,191

(22) Filed: Dec. 11, 2014

(65) Prior Publication Data

US 2015/0092565 A1 Apr. 2, 2015

Related U.S. Application Data

(63) Continuation of application No. PCT/CN2012/077455, filed on Jun. 25, 2012.

(51) Int. Cl.
*H04W 24/08* (2009.01)
*H04L 12/24* (2006.01)
(Continued)

(52) U.S. Cl.
CPC .......... *H04W 24/08* (2013.01); *H04L 41/0631* (2013.01); *H04L 41/5067* (2013.01); *H04L 43/50* (2013.01); *H04W 24/04* (2013.01)

(58) Field of Classification Search
CPC ...... H04M 15/47; H04W 24/08; H04W 12/12; H04L 43/50
See application file for complete search history.

(56) References Cited

U.S. PATENT DOCUMENTS

2004/0198328 A1* 10/2004 Brandenberger ..... H04M 1/006 455/414.1
2006/0236325 A1 10/2006 Rao et al.
(Continued)

FOREIGN PATENT DOCUMENTS

CN 1863095 A 11/2006
CN 101026506 A 8/2007
(Continued)

OTHER PUBLICATIONS

"Recommendation ITU-T H.264—Series H: Audiovisual and Multimedia Systems—Infrastructure of audiovisual services—Coding of moving video—Advanced video coding for generic audiovisual services," pp. i-657, International Telecommunication Union, Geneva, Switzerland (Jan. 2012).

*Primary Examiner* — Jung Park
(74) *Attorney, Agent, or Firm* — Leydig, Voit & Mayer, Ltd.

(57) ABSTRACT

Embodiments of the present invention provide a fault diagnosis method and apparatus. A service in the fault diagnosis method relates to at least one user, and the fault diagnosis method includes: determining whether a terminal of each user allows performing fault diagnosis for the service; and performing fault diagnosis for the service if the terminal of each user allows performing fault diagnosis for the service. In the embodiments of the present invention, fault diagnosis for the user related service cannot be performed unless allowed by a user terminal or allowed by both the user terminal and a system side. Thereby, it is ensured that fault diagnosis is performed in a secure environment, which better complies with security laws and regulations.

18 Claims, 2 Drawing Sheets

(51) Int. Cl.
*H04L 12/26* (2006.01)
*H04W 24/04* (2009.01)

(56) References Cited

U.S. PATENT DOCUMENTS

| | | |
|---|---|---|
| 2010/0197238 A1 | 8/2010 | Pathuri et al. |
| 2011/0137518 A1 | 6/2011 | Abe |
| 2011/0143747 A1 | 6/2011 | Jia et al. |
| 2011/0188403 A1* | 8/2011 | Calippe ................ H04W 24/08 370/254 |

FOREIGN PATENT DOCUMENTS

| | | | |
|---|---|---|---|
| CN | 101316430 A | 12/2008 |
| CN | 101388801 A | 3/2009 |
| CN | 101911592 A | 12/2010 |
| CN | 102105910 A | 6/2011 |

* cited by examiner

FAULT DIAGNOSIS METHOD AND
APPARATUS

CROSS-REFERENCE TO RELATED
APPLICATIONS

This application is a continuation of International Patent Application No. PCT/CN2012/077455, filed on Jun. 25, 2012, which is hereby incorporated by reference in its entirety.

TECHNICAL FIELD

Embodiments of the present invention relate to the communication field, and in particular, to a fault diagnosis method and apparatus in a communication system complying with security regulations.

BACKGROUND

A telecommunication device is responsible for processing a voice, short message, multimedia, or data service of a terminal user according to a standard protocol that the telecommunication device complies with. The personal service data is generally only processed in the singling plane and service plane. For example, in the architecture of a telecommunication network, a lawful interception interface is allowed to exist only in a core network, and the interface is a standard service interface of a protocol. In OAM (operation, administration, and maintenance) planes of all communication devices and in other access network elements not within the core network, the function of collecting user personal service data is not allowed. Meanwhile, laws of many countries all directly or indirectly stipulate that personal call content belongs to the privacy protection scope, and forbid vendors/operators to provide, for the purpose of guaranteeing network operation and services, the function of collecting original communication content (voice type, short message/multimedia message type, fax type, and data service type) of end users.

At present, there are mainly two fault diagnosis methods complying with security regulations.

The first fault diagnosis method is: An access device supports capturing user service original data in the OAM plane in a system but neither stores nor directly outputs the original data to the outside of the access device and directly outputs the original data to a fault diagnosis and analysis module integrated in the access device for performing packet parsing layer by layer and sampling typical indicators. After the process is completed, the user service original data is discarded, and the sampled indicators, for example, signal quality and waveform data, are output to an indicator analysis module outside the access device. Because the sampled indicator data does not relate to the personal call content of a terminal user, the indicator data may be directly used in the OAM plane outside the access device to implement operation and maintenance functions such as fault diagnosis of the telecommunication device. However, because there are many types of voice coding/decoding algorithms and scenarios of voice faults are complex, the efficiency of fault diagnosis is low, and the integrated fault diagnosis and analysis module and the indicator analysis module increase complexity of the system.

The second fault diagnosis method is using an independent dialing test device to perform voice detection. However, the independent dialing test device needs to add an additional service load to the existing communication system, which may affect normal running of the communication system. Furthermore, for the independent dialing test device, hardware such as an external dialing test server and a terminal needs to be purchased, and the cost is high. In addition, the independent dialing test device is capable of providing voice quality KPI (Key Performance Indicators), and relative to the complete voice packet capturing, this is not enough and can hardly satisfy voice quality fault processing requirements of common users.

SUMMARY

Embodiments of the present invention provide a fault diagnosis method and apparatus, aiming to solve the technical problem of legally applying personal data of a terminal user to operation and maintenance.

In one aspect, a fault diagnosis method is provided, where a service in the method relates to at least one user and the method includes: determining whether a terminal of each user allows performing fault diagnosis for the service; and performing fault diagnosis for the service if the terminal of each user allows performing fault diagnosis for the service.

Optionally, before performing fault diagnosis for the service, the fault diagnosis method further includes determining that a system side allows performing fault diagnosis for the service.

Further, if the terminal of each user allows performing fault diagnosis for the service, the performing fault diagnosis for the service includes: performing fault diagnosis for the service if the terminal of each user allows performing fault diagnosis for the service and the system side also allows performing fault diagnosis for the service.

Further, the determining that the system side allows performing fault diagnosis for the service of each user includes: determining, through a system-side authority list, that the system side allows performing fault diagnosis for the service of each user, where the system-side authority list includes at least an identifier of each user, a service of each user, and information about whether the system side allows performing fault diagnosis for each service of the user.

Optionally, the determining whether the terminal of each user allows performing fault diagnosis for the service includes: determining, through information fed back by the terminal of each user, that the terminal of the user allows performing fault diagnosis for the service.

Further, the determining, through information fed back by the terminal of each user, that the terminal of each user allows performing fault diagnosis for the service includes: if the terminal of each user dials a specific dual tone multi frequency DTMF number, or the terminal of each user dials a specific operation and maintenance number, or the terminal of each user holds a call for a specified duration, determining that the terminal of each user allows performing fault diagnosis for the service.

Optionally, the fault diagnosis method further includes: not performing fault diagnosis for the service if the terminal of any one user does not allow performing fault diagnosis for the service.

Optionally, the fault diagnosis method further includes: if the terminal of any one user does not allow performing fault diagnosis for the service, sending an authorization request to the terminal of the any one user to request to allow performing fault diagnosis for the service; and performing fault diagnosis for the service after determining that the terminal of the any one user allows performing fault diagnosis for the service.

Optionally, the performing fault diagnosis for the service includes: performing fault diagnosis for the service in a current service process; or performing fault diagnosis for the service in a next service process.

In another aspect, a fault diagnosis apparatus is provided, where a service diagnosed by the apparatus relates to at least one user and the apparatus includes: a first determining unit, configured to determine whether a terminal of each user allows performing fault diagnosis for the service; and a diagnosing unit, configured to perform fault diagnosis for the service if the terminal of each user allows performing fault diagnosis for the service.

Optionally, the fault diagnosis apparatus further includes: a second determining unit, configured to determine, before performing fault diagnosis for the service, that a system side allows performing fault diagnosis for the service.

Optionally, the diagnosing unit performs fault diagnosis for the service after the first determining unit determines that the terminal of each user allows performing fault diagnosis for the service and the second determining unit determines that the system side allows performing fault diagnosis for the service.

Optionally, the second determining unit is specifically configured to: determine, through a system-side authority list, that the system side allows performing fault diagnosis for the service of each user, where the system-side authority list includes at least an identifier of each user, a service of each user, and information about whether the system side allows performing fault diagnosis for each service of the user.

Optionally, the first determining unit is specifically configured to determine, through information fed back by the terminal of each user, that the terminal of the user allows performing fault diagnosis for the service.

Optionally, the first determining unit is specifically configured to: if the terminal of each user dials a specific dual tone multi frequency DTMF number, or the terminal of each user dials a specific operation and maintenance number, or the terminal of each user holds a call for a specified duration, determine that the terminal of each user allows performing fault diagnosis for the service.

Optionally, the fault diagnosis apparatus further includes: a sending unit, configured to: if the terminal of any one user does not allow performing fault diagnosis for the service, send an authorization request to the terminal of the any one user to request to allow performing fault diagnosis for the service. Therefore, the diagnosing unit is configured to perform fault diagnosis for the service after it is determined that the terminal of the any one user allows performing fault diagnosis for the service.

Optionally, the diagnosing unit is specifically configured to: perform fault diagnosis for the service in a current service process; or perform fault diagnosis for the service in a next service process.

In another aspect, a fault diagnosis apparatus is provided and includes a memory and a processor, where the memory is configured to store codes for implementing the fault diagnosis methods according to embodiments of the present invention; and the processor is configured to execute the codes stored by the memory.

In the embodiments of the present invention, fault diagnosis for the user related service cannot be performed unless allowed by a user terminal or allowed by both the user terminal and the system side. Thereby, it is ensured that fault diagnosis is performed in a secure environment, which better complies with security laws and regulations.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

The technical solutions of the present invention may be applied in various communication systems, such as, the GSM, code division multiple access (CDMA) system, wideband code division multiple access (WCDMA) system, general packet radio service (GPRS) system, and long term evolution (LTE) system.

A UE may also be referred to as a mobile terminal, a mobile user equipment, and so on, and can communicate with one or more core networks through a radio access network (RAN); a mobile user equipment may be a mobile phone (such as a "cellular" phone) and a computer having a mobile terminal, for example, a portable, pocket-sized, handheld, computer built-in, or vehicle-mounted mobile apparatus.

A base station may be a base station (BTS, Base Transceiver Station) in GSM system or CDMA system, or may also be a base station (NodeB) in WCDMA, or may also be an evolved base station (eNB or e-NodeB, evolved Node B) in LTE.

The fault diagnosis method in the embodiments of the present invention includes two stages, authorization and diagnosis. For the purpose of operation and maintenance, fault diagnosis complying with security laws and regulations cannot be performed unless allowed by a terminal or allowed by both the terminal and a system side. Fault diagnosis can be performed by using the manners such as recording and data packet capturing only after being allowed by the terminal or allowed by both the system side and the terminal.

Figure 1:
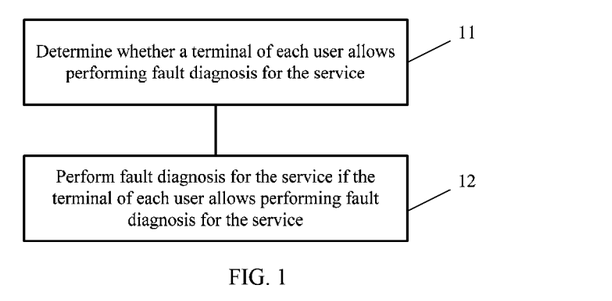
FIG. 1 is a flowchart of a fault diagnosis method according to an embodiment of the present invention.

The fault diagnosis method according to an embodiment of the present invention is described in detail with reference to FIG. 1, where a service in the method relates to at least one user and the method includes the following steps:

11. A communication device determines whether a terminal of each user allows performing fault diagnosis for the service, and executes step 12 if the terminal of each user allows performing fault diagnosis for the service.

12. The communication device performs fault diagnosis for the service.

Optionally, before step 12, the communication device may further determine that a system side allows performing fault diagnosis for the service; if the system side and the terminal of each user allow performing fault diagnosis for the service, step 12 is executed.

It should be noted that unless otherwise specified, the communication device in this document may be arranged in a core network or may also be arranged in an access network.

Optionally, if the system side does not allow performing fault diagnosis for the service and/or the terminal of at least one user does not allow performing fault diagnosis for the service, the communication device does not perform fault diagnosis for the service.

For example, in the case that the service relates to only one user (for example, a first user), if the system side allows performing fault diagnosis for services of all users by default, the communication device only needs to confirm whether the terminal of the user allows performing fault diagnosis for the service; if the terminal of the user allows performing fault diagnosis for the service, the communication device performs fault diagnosis for the service; otherwise, the communication device does not perform fault diagnosis for the service.

If the system side does not allow performing fault diagnosis for services of all users by default, the communication device cannot perform fault diagnosis for the services unless the system side and the terminals of the users allow performing fault diagnosis. Using the first user as an example, the communication device first determines whether the system side allows performing fault diagnosis for the service of the first user and whether the terminal of the first user allows performing fault diagnosis for the service; if the system side allows performing fault diagnosis for the service of the first user and the terminal of the first user also allows performing fault diagnosis for the service, the communication device performs fault diagnosis for the service; otherwise, the communication device does not perform fault diagnosis for the service.

The communication device may determine, through a configured authority list, whether the system side allows performing fault diagnosis for the service of the first user.

Optionally, the communication device may also determine, through information fed back by the terminal of the first user, whether the terminal of the first user allows performing fault diagnosis for the service, where the feedback information may be sent by the terminal of the first user to the communication device in a process of starting fault diagnosis. In this embodiment, the fault diagnosis process may be started in the following manner: The terminal of the first user dials a specific DTMF (dual tone multi frequency) number; or the terminal of the first user dials a specific operation and maintenance number; or the terminal of the first user holds the call for a specified duration.

After the communication device determines that the system side allows performing fault diagnosis for the service of the first user and that the terminal of the first user also allows performing fault diagnosis for the service, the communication device may perform fault diagnosis for the service of the first user. Otherwise, if the system side does not allow performing fault diagnosis for the service of the first user and/or the terminal of the first user does not allow performing fault diagnosis for the service, the communication device determines not to perform fault diagnosis for the service of the first user.

In the case that a service relates to multiple users, for example, the first user and a second user are performing a service together, the communication device may determine whether the system side respectively allows performing fault diagnosis for the service of the first user and the second user and whether both the terminal of the first user and the terminal of the second user allow performing fault diagnosis for the service; if the system side allows performing fault diagnosis for the service of the first user and the second user, and both the terminal of the first user and the terminal of the second user allow performing fault diagnosis for the service, the communication device may perform fault diagnosis for the service used or joined by the first user and the second user together. Otherwise, the communication device cannot perform fault diagnosis for the service used or joined by the first user and the second user together. That is, the communication device does not perform fault diagnosis for the service if the terminal of any one user does not allow performing fault diagnosis for the service used or joined by the two terminals together.

Or, if the terminal of any one user does not allow performing fault diagnosis for the service, the communication device sends an authorization request to the terminal of the any one user to request to allow performing fault diagnosis for the service; and the communication device performs fault diagnosis for the service after determining that the terminal of the any one user allows performing fault diagnosis for the service.

The communication device may determine, through the configured authority list, whether the system side allows performing fault diagnosis for the service of the first user and the second user, where the authority list includes information about whether the system side allows diagnosis for each service of each user.

Optionally, the communication device may also determine, through information fed back by the terminal of the first user, whether the terminal of the first user allows performing diagnosis for the service; and determine, through information fed back by the terminal of the second user, whether the terminal of the second user allows performing fault diagnosis for the service.

When the communication device determines to perform fault diagnosis for the service, the communication device may perform fault diagnosis for the service in the current service process, or may also perform fault diagnosis for the service in the next service process.

As seen above, in the embodiment of the present invention, fault diagnosis for the user related service cannot be performed unless allowed by the terminal of the user or allowed by both the terminal of the user and the system side. Therefore, the fault diagnosis process better complies with security laws and regulations.

The following describes how to perform fault diagnosis by using a voice service as an example. It is understandable that the fault diagnosis procedures of other services are also similar to the fault diagnosis procedure of the voice service.

First, a system-side authority list is configured in the communication device, where the system-side authority list includes at least an identifier of each user, a service of each user, and information about whether the system side allows performing fault diagnosis for each service of the user. A network administrator (for example, an operator system administrator) may add, delete, modify, or search for related information in the authority list. It should be understood that the communication device may be a communication device of the core network or may also be a communication device of the access network. For example, when the first user (for example, serving as a voice caller or a voice callee) performs a service (for example, the voice service), the communication device may determine, according to the system-side authority list, whether the system side allows performing fault diagnosis for the service of the first user; if an authorization status on the system side is "allowed", it indicates that the system side allows the communication device to perform fault diagnosis for the voice service of the first user; if the authorization status on the system side is "not allowed", it indicates that the system side does not allow the communication device to perform fault diagnosis for the voice service of the first user.

The system-side authority list configured in the communication device may be specifically shown in Table 1. Table 1 includes the identifier of the user, the service of each user, and information of the system authorization status with respect to each service (namely, whether the system side allows performing fault diagnosis for the corresponding service of the user). The services of the user in Table 1 include the voice service, SMS (short message service) service, DTMF (Double Tone Multiple Frequency) service, data service, and so on. It is understandable that in the actual application, various services of the user may also not be classified in Table 1, that is, the operator considers by default that the system side allows performing fault diagnosis for all services of the first user.

TABLE 1

System-side authority list

|  | User Identifier | Service | System Authorization Status | Terminal Authorization Status (Optional) |
| --- | --- | --- | --- | --- |
| System-Side Authority Configuration | IMSI/NAI/ USER NAME | 1X voice | Allowed/Not Allowed | Allowed/Not Allowed |
|  |  | SMS | Allowed/Not Allowed | Allowed/Not Allowed |
|  |  | DTMF | Allowed/Not Allowed | Allowed/Not Allowed |
|  |  | 1x EV-DO data service | Allowed/Not Allowed | Allowed/Not Allowed |

Herein Table 1 is described by using the CDMA system as an example. In Table 1, services of the user may be classified into a 1× voice service, an SMS service, a DTMF service, a DO data service, and so on. It should be understood that Table 1 may also be applied to other systems, such as, a GSM system and an LTE system. For different communication systems, the above identifiers and services of the user may be different.

In addition, a terminal authorization status column may be added to the system-side authority list, so that whether the user corresponding to the terminal also allows performing fault diagnosis for the corresponding service may be quickly found. Or, an additional terminal-side authority list may also be configured in the communication device, and its form may refer to the system-side authority list.

It should be noted that the communication device may further store a mapping relationship between the terminal identifier, the user identifier, and the service identifier, as shown in Table 2. When the service that needs to be diagnosed relates to multiple users, the communication device may quickly find the related user identifiers from Table 2 according to the service identifier of the service, and then determine, according to the found user identifiers and Table 1, whether the system side allows performing fault diagnosis for the voice service of the multiple users.

TABLE 2

Mapping relationship between the terminal identifier, the user identifier, and the service identifier

|  | Terminal Identifier | User Identifier | Service Identifier |
| --- | --- | --- | --- |
| System-Side Configuration | MEID/ESN/IMEI | IMSI/NAI/TMSI | MDN/IP/MAC |

MEID indicates a mobile equipment identity, ESN indicates an electronic serial number, and IMEI indicates an international mobile equipment identity; and the MEID, ESN, and IMEI are terminal identities. IMSI indicates an international mobile subscriber identity, NAI indicates a network access identity, and TMSI indicates a temporary mobile subscriber identity; and the IMSI, NAI, and TMSI are user identities. MDN indicates a mobile directory number, namely, a phone number, the IP address is an Internet Protocol address, and a MAC address is a media access control address; the MDN and IP/MAC address are service identifiers. Table 2 is described only by using the CDMA system as an example. For other systems, for example, a GSM system and an LTE system, the above terminal identifier, user identifier, and service identifier may be different.

The process of determining whether the system side allows performing fault diagnosis for a service of the first user is described above. After it is determined that the system side allows performing fault diagnosis for the service of the first user, it is further necessary to determine whether the terminal side of the first user also allows performing fault diagnosis for the service. The communication device can perform fault diagnosis such as call recording or data packet capturing for the service of the first user within a fixed time limit only when both the system side and the terminal side allow performing fault diagnosis for the service of the first user.

Specifically, first whether the terminal of the first user allows fault diagnosis is determined. The terminal of the first user may determine to start the fault diagnosis process by dialing a specific DTMF number or an operation and maintenance number in the service process. In the following description, it is assumed that the terminal of the first user dials a DTMF number. After the first user enters a call state, the communication device starts playing an authorization announcement if detecting that the terminal of the first user dials a specific DTMF number, for example, "The system will obtain the recording test authority of your call within 24 hours after the current call; press 1 to confirm, press 0 to cancel, or otherwise hang up." Optionally, if the system side classifies various service diagnosis authorities, the authorization announcement played by the communication device may also include information of various services; for example, the authorization announcement played by the communication device is "The system will obtain the diagnosis test authority of your call within 24 hours after the current call; press 1 to authorize 1× voice diagnosis, press 2 to authorize SMS diagnosis, press 3 to authorize DO data diagnosis, press 0 to cancel all authorities, or otherwise hang up." Or the communication device plays different announcements respectively according to the authorization status of the terminal of the first user with respect to various services in the system-side authority list; for example, to the user terminal which allows performing fault diagnosis for only the SMS service, the following announcement is played, "The system will obtain the diagnosis test authority of your SMS service within 24 hours after the current call; press 1 to authorize, press 0 to cancel authorities, or otherwise hang up." It should be understood that the content of the authorization announcement is not limited to the form enumerated in this document, and that the operator or vendor may design different authorization announcement content according to the actual application.

The communication device waits for feedback of the user after playing the announcement, for example, the first user presses the corresponding key on the terminal to perform feedback. The communication device knows, after receiving the feedback of the first user, whether the terminal of the first user allows performing fault diagnosis for the corresponding service (for example, reference may be made to "Terminal Authorization Status" in Table 1 or the communication device generates a separate terminal-side authority list according to the feedback of the terminal of each user).

Upon completion of one authorization stage, if the terminal of the first user allows performing fault diagnosis for the service, and the system side also allows performing fault diagnosis for the service of the first user, the communication device performs fault diagnosis for the service of the first user.

It should be understood that the communication device should perform fault diagnosis for the service of the first user within a fixed time limit, for example, within a fixed time limit (24 hours), the communication device may obtain the data related to the service of the first user, but after the fixed time limit, the communication device deletes the data related to the service of the first user. In addition, the communication device also supports the user in canceling fault diagnosis anytime.

Specifically, an operator system administrator may first configure a system-side authority list, for example, Table 1. After the first user makes a voice call, the communication device may determine, according to the user identifier of the first user and Table 1, whether the system side allows performing fault diagnosis for the voice call service of the first user. If the system does not allow performing fault diagnosis for the voice call service of the first user, the communication device does not perform fault diagnosis for the voice call service of the first user, and the terminal of the first user still holds the original voice call service; if the system allows performing fault diagnosis for the voice call service of the first user, the communication device continues to detect whether the terminal of the first user dials a specific DTMF number. If the communication device detects that the terminal of the first user does not dial a specific DTMF number, the communication device is not capable of performing fault diagnosis for the voice call service of the first user, and the first user still holds the original voice call service; if the communication device detects that the terminal of the first user dials a specific DTMF number, the communication device starts playing an authorization announcement, and then waits for a keystroke response of the first user. When the communication device determines that the first user allows performing fault diagnosis for the voice call service of the first user, the communication device may start fault diagnosis for the terminal of the first user within the authorized time limit. Optionally, the communication device may also store the status of whether the terminal of the first user allows performing fault diagnosis for the voice call service into a terminal-side authority list or into the terminal authorization status column of the system-side authority list.

The above fault diagnosis procedure is applicable to countries whose laws forbid performing fault diagnosis by using the manners such as call recording or data packet capturing. For countries whose laws allow performing fault diagnosis by using the manners such as call recording or data packet capturing and operators that allow by default performing authorization for fault diagnosis of all users (for example, including the first user) served by the system, it is unnecessary to determine whether the system side allows performing fault diagnosis for the service of the first user, and it may be directly determined whether the terminal of the first user allows performing fault diagnosis for the service.

For example, the first user makes a voice call and enters a call state, and then the communication device detects whether the terminal of the first user starts the fault diagnosis procedure, for example, the first user may start the fault diagnosis procedure through a specific DTMF number. If the communication device detects that the terminal of the first user does not dial a specific DTMF number, the communication device does not perform fault diagnosis for the voice call service of the first user, and the first user still holds the original voice call service; if the communication device detects that the terminal of the first user dials a specific DTMF number, the communication device starts playing an authorization announcement, and then waits for a keystroke response of the first user; if the first user presses the correct key, the communication device determines that the terminal of the first user allows performing fault diagnosis for the voice call service, and afterward (for example, when operation and maintenance personnel initiate a fault diagnosis procedure), the communication device performs fault diagnosis for the voice call service of the first user. The communication device may perform fault diagnosis for the voice call service of the first use within the authorized time limit. Further, the communication device may also store the status of whether the terminal of the first user allows performing fault diagnosis for the voice call service into a terminal-side authority list or into the terminal authorization status column of the system-side authority list.

Both the above two authorization procedures may be regarded as one authorization stage. Upon completion of one authorization stage, the communication device may determine whether both the system side and the terminal of a user allow performing fault diagnosis for the service of the user; and if so, the communication device may perform fault diagnosis for the service of the user.

As described above, the first user may start the fault diagnosis procedure by dialing a DTMF number through the terminal. However, if the DTMF service is faulty, the first user cannot start the fault diagnosis procedure by dialing a DTMF number through the terminal. Therefore, other manners need to be used to start the fault diagnosis procedure, so as to diagnose the fault of the DTMF service. In this case, the first user may dial a specific operation and maintenance number, and the communication device determines whether the system side allows performing fault detection for the DTMF service of the first user, for example as shown in Table 1, may find the DTMF service of the first user according to the user identifier (for example, IMSI) of the first user, and then determine the system authorization status corresponding to the DTMF service. If the authorization status on the system side is "allowed", it indicates that the system side allows performing fault diagnosis for the DTMF service of the first user. If the authorization status on the system side is "not allowed", it indicates that the system side does not allow performing fault diagnosis for the DTMF service of the first user. After the communication device determines that the system side allows performing fault diagnosis for the DTMF service of the first user, the communication device directly plays an authorization announcement to the terminal of the first user, for example, "You have entered the terminal fault diagnosis mode; the system will obtain the DTMF packet monitoring authorities of the terminal and other authorized terminals within 24 hours after the current call, and automatically cancel your authority after expiry. Hold the call for 15 seconds to agree and the system will automatically hang up after an announcement, or otherwise, hang up immediately." Then the communication device detects whether the first user hangs up within 15 seconds, and if so, it indicates that the terminal of the first user does not allow performing fault diagnosis for the DTMF service. The current call ends when the first user hangs up. If the first user does not hang up within 15 seconds, the communication device may perform fault diagnosis for the DTMF service of the first user within the authorized time limit.

To conclude, the terminal side feeds back the information of allowing performing fault diagnosis for the service of the first user to the communication device in the following way: dialing a specific DTMF number in a call, or dialing a specific operation and maintenance number, or holding a call, and so on.

The above content indicates that the communication device can perform fault diagnosis for the service of the first user only after the communication device determines that the system side allows performing fault diagnosis for the service of the first user and/or that the terminal of the first user also allows performing diagnosis for the service.

When the service operation relates to more than two users, when the system performs diagnosis, the system must determine whether the terminal of each user related to the service allows performing fault diagnosis for the service. The communication device can perform fault diagnosis for the service only when the system side and the terminals of multiple users all allow performing fault diagnosis for the service. For example, assuming that a service relates to a first user and a second user, if, for the service of the first user, both the system side and the terminal of the first user allow performing fault diagnosis for the service, and for the service of the second user, the system side allows performing fault diagnosis for the service of the second user, but the allowance of the terminal side of the second user is not obtained, the communication device may directly play an authorization announcement to the terminal of the second user. If the terminal of the second user allows, by keystroke feedback or holding the call for a period, performing diagnosis for the service, the communication device may start to perform fault diagnosis for the service related to both the first user and the second user.

Specifically, the operator system administrator may configure a system-side authority list in the communication device, for example, Table 1. After the caller makes a voice call, assuming that the communication device needs to perform fault diagnosis for the voice call service of the user, if the communication device determines that both the system side and the terminal of the caller allow performing fault diagnosis for the voice call service, the communication device may determine the user identifier of the callee according to Table 2 and the user identifier and service identifier of the caller, and afterward, determine whether the system side and the terminal of the callee also allow performing fault diagnosis for the voice call service of the callee. If the system side does not allow performing fault diagnosis for the voice call service of the callee, the communication device does not perform fault diagnosis for the voice call service, and the caller and the callee continue to hold the original voice call service; if both the system side and the terminal of the callee allow performing fault diagnosis for the voice call service of the callee, the communication device performs fault diagnosis for the voice call service between the caller and the callee within the authorized time limit; if the system side allows performing fault diagnosis for the voice call service of the callee, but the terminal of the callee does not allow performing fault diagnosis for the voice call service, the communication device may actively send an authorization request to the terminal of the callee, requesting the terminal of the callee to allow performing fault diagnosis for the voice call service, or the caller triggers the communication device to send an authorization request to the terminal of the callee, requesting the terminal of the callee to allow performing fault diagnosis for the voice call service.

In the following description, two users are used as an example. It is understandable that when the call service relates to more than two users, reference may also be made to the following fault diagnosis procedure.

First, the terminal user initiates a normal voice service call, so that the communication device enters a normal voice service processing procedure. When the system needs to perform fault diagnosis for the voice call service, the communication device may find the user identifier (for example, an IMSI) of the caller (for ease of description, in the embodiment of the present invention, the caller is referred to as "first user") and the user identifier (for example, an IMSI) of the callee (for ease of description, in the embodiment of the present invention, the callee is referred to as "second user") according to the voice service identifier and Table 2, and determine whether the system side and the terminal of the first user and the terminal of the second user allow performing fault diagnosis for the voice call service. If the system side and the terminal of the first user and the terminal of the second user allow performing fault diagnosis for the voice service, the communication device performs fault diagnosis for the voice call service; otherwise, the communication device does not perform fault diagnosis for the voice call service but maintain the normal call between the two parties. Further, if the communication device determines that the system side allows performing fault diagnosis for the voice service of the first user and second user, and that the terminal of the first user also allows performing fault diagnosis for the voice service but the terminal of the second user does not allow performing fault diagnosis for the voice service, the communication device may send an authorization request to the second user, requesting the second user to allow performing fault diagnosis for the voice service. For example, the communication device may play an authorization announcement to the second user: "Your current call will be recorded; hold the call to agree, or otherwise please hang up." If the second user holds the current call according to the authorization announcement, it indicates that the second user allows performing fault diagnosis for the service. Otherwise, if the second user hangs up, it indicates that the second user does not allow performing fault diagnosis for the service; in this case, the communication device does not start fault diagnosis.

In the above description, it is assumed that the communication device actively sends an authorization request to the second user. In the actual application, the communication device may also send the authorization request to the second user after receiving the trigger of the first user. For example, after the first user connects the call, the first user dials a specific DTMF number to trigger the communication device to play an authorization announcement to the second user, requesting the second user to allow performing fault diagnosis for the voice service.

To conclude, before the communication device performs fault diagnosis for a service, the communication device first needs to determine whether both the system side and the terminals of the users related to the service all allow performing fault diagnosis for the service; if the system side and the terminals of the users related to the service all allow performing fault diagnosis for the service, the communication device may perform fault diagnosis for the service by using the manners such as data packet capturing or recording. When the service relates to multiple users, if only the terminal of one or several users does not allow performing fault diagnosis for the service, the communication device may send an authorization request to the terminal of the one or several users, requesting the terminal of the one or several users to allow performing fault diagnosis for the voice call service. That is, in each service, the communication device needs to determine whether the terminals of the users related to the service all allow performing fault diagnosis for the service. If so, the communication device performs fault diagnosis for the service; and if not, the communication device does not perform fault diagnosis for the service, or the communication device sends an authorization request to a user terminal that does not allow performing fault diagnosis, requesting to allow performing fault diagnosis for the service.

It should be understood that the communication device may continue to reserve the existing function of performing fault diagnosis for the service of a single user, for example, setting voice (SET VOICE), setting packet capturing (SET CAPPACKS), and single-user tracing of the system explorer (SE). The communication device may further reserve a local maintenance terminal (LMT) signaling tracing interface, and modify the system-side authority list.

It should be understood that the fault diagnosis performed by the above communication device may be performed in the current service process, or may also be performed in the next service process. For example, after determining that the terminals of the users related to the service and the system side all allow performing fault diagnosis for the service, the communication device may select the following two manners to perform fault diagnosis for the service: One is performing the corresponding fault diagnosis procedure at the beginning of the next service, or the other is instantly starting the corresponding fault diagnosis procedure in the current service.

In another fault diagnosis mode, a diagnosis trigger condition may be preset when the service is not initiated. If the diagnosis trigger condition is satisfied, and the communication device determines that the terminals of the users related to the service and the system side all allow performing fault diagnosis for the service, the communication device immediately starts to perform fault diagnosis for the current service. For example, the preset diagnosis trigger condition is: The user dials a specific DTMF number; the communication device detects that a user dials a DTMF number in the process of performing a voice service, and determines that the terminals of the users related to the voice service and the system side all allow performing fault diagnosis for the service; therefore the communication device may immediately start to perform fault diagnosis for the current voice service.

As seen above, the fault diagnosis method in the embodiment of the present invention cannot be performed unless allowed by a user terminal or allowed by both the user terminal and the system side. Thereby, it is ensured that fault diagnosis is performed in a secure environment, which better complies with security laws and regulations.

Figure 2:
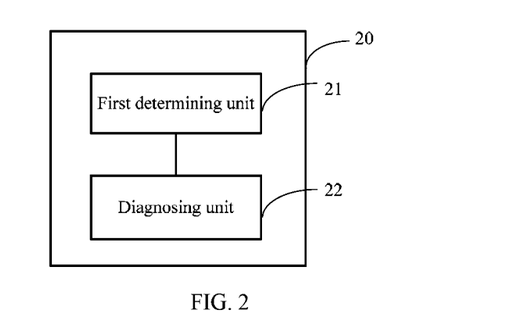
FIG. 2 is a schematic structural diagram of a fault diagnosis apparatus according to an embodiment of the present invention.
Figure 3:
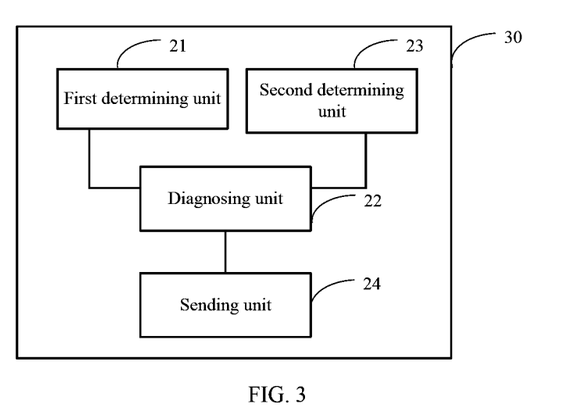
FIG. 3 is another schematic structural diagram of a fault diagnosis apparatus according to an embodiment of the present invention.

The following describes a fault diagnosis apparatus according to an embodiment of the present invention with reference to FIG. 2 and FIG. 3.

In FIG. 2, a fault diagnosis apparatus 20 includes a first determining unit 21 and a diagnosing unit 22. Herein a service diagnosed by the fault diagnosis apparatus 20 relates to at least one user.

The first determining unit 21 is configured to determine whether the terminal of each user allows performing fault diagnosis for the service. The diagnosing unit 22 is configured to perform fault diagnosis for the service after the first determining unit 21 determines that the terminal of each user allows performing fault diagnosis for the service.

In addition, in another embodiment shown in FIG. 3, a fault diagnosis apparatus 30 may further include a second determining unit 23, configured to determine, before the diagnosing unit 22 performs fault diagnosis for the service, that the system side allows performing fault diagnosis for the service. The diagnosing unit 22 performs fault diagnosis for the service after the first determining unit 21 determines that the terminal of each user allows performing fault diagnosis for the service and the second determining unit 23 determines that the system side allows performing fault diagnosis for the service.

Optionally, the second determining unit 23 is configured to: determine, through a system-side authority list, that the system side allows performing fault diagnosis for the service of each user, where the system-side authority list includes at least an identifier of each user, a service of each user, and information about whether the system side allows performing fault diagnosis for each service of the user.

Optionally, the first determining unit 21 is configured to determine, through information fed back by the terminal of each user, that the terminal of the user allows performing fault diagnosis for the service.

The first determining unit 21 is specifically configured to: if the terminal of each user dials a specific dual tone multi frequency DTMF number, or the terminal of each user dials a specific operation and maintenance number, or the terminal of each user holds a call for a specified duration, determine that the terminal of each user allows performing fault diagnosis for the service.

Optionally, the fault diagnosis apparatus 30 may further include a sending unit 24, configured to: if the terminal of any one user does not allow performing fault diagnosis for the service, send an authorization request to the terminal of the any one user to request to allow performing fault diagnosis for the service. Thereby, the diagnosing unit 22 is configured to perform fault diagnosis for the service after it is determined that the terminal of the any one user allows performing fault diagnosis for the service.

Optionally, the diagnosing unit 22 is configured to perform fault diagnosis for the service in a current service process; or perform fault diagnosis for the service in a next service process.

As seen above, the fault diagnosis apparatus in the embodiment of the present invention obtains authorization of the user terminal or authorization of both the user terminal and the system side. Thereby, it is ensured that fault diagnosis is performed in a secure environment, which better complies with security laws and regulations.

Figure 4:
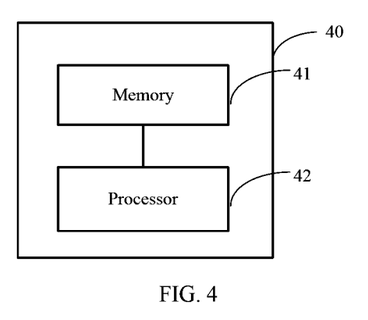
FIG. 4 is a schematic structural diagram of a fault diagnosis apparatus according to another embodiment of the present invention.

In addition, an embodiment of the present invention further provides another fault diagnosis apparatus, where the apparatus 40 includes a memory 41 and a processor 42, where the memory 41 is configured to store codes for implementing the steps in the above method embodiments, and the processor 42 is configured to execute the codes stored by the memory 41.

Persons of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or part of the technical solutions may be implemented in the form of a software product. The computer software product is stored in a storage medium, and includes several instructions for instructing a computer device (which may be a personal computer, a server, or a network device) to perform all or a part of the steps of the method described in the embodiment of the present invention. The storage medium includes: any medium that can store program codes, such as a USB flash disk, a removable hard disk, a read-only memory (ROM, Read-Only Memory), a random access memory (RAM. Random Access Memory), a magnetic disk, or an optical disk.

The foregoing descriptions are merely exemplary embodiments of the present invention, but are not intended to limit the protection scope of the present invention. Any variation or replacement made by persons skilled in the art within the technical scope disclosed in the present invention shall fall within the protection scope of the present invention. Therefore, the protection scope of the present invention shall be subject to the claims.

What is claimed is:

1. A fault diagnosis method, wherein a service diagnosed by a fault diagnosis apparatus relates to at least one user, and the method comprises:
   determining, by the fault diagnosis apparatus, whether a terminal of each user allows performing fault diagnosis for the service;
   sending, by the fault diagnosis apparatus, an authorization request to any terminal determined to not allow performing the fault diagnosis for the service; and
   performing the fault diagnosis for the service when all of the terminals allow performing the fault diagnosis for the service.

2. The method according to claim 1, wherein before performing the fault diagnosis for the service, the method further comprises:
   determining that a system side allows performing the fault diagnosis for the service.

3. The method according to claim 2, wherein when the terminal of each user allows performing the fault diagnosis for the service, the performing the fault diagnosis for the service comprises:
   performing the fault diagnosis for the service when both the terminal of each user and the system side allow performing the fault diagnosis for the service.

4. The method according to claim 2, wherein determining that the system side allows performing the fault diagnosis for the service of each user comprises:
   determining, through a system-side authority list, that the system side allows performing the fault diagnosis for the service of each user, wherein the system-side authority list comprises at least an identifier of each user, a service of each user, and information about whether the system side allows performing the fault diagnosis for each service of the user.

5. The method according to claim 1, wherein determining whether the terminal of each user allows performing the fault diagnosis for the service comprises:

determining, through information fed back by the terminal of each user, that the terminal of the user allows performing the fault diagnosis for the service.

6. The method according to claim 5, wherein determining, through the information fed back by the terminal of each user that the terminal of the user allows performing the fault diagnosis for the service comprises:
when the terminal of each user dials a specific dual tone multi frequency (DTMF) number, determining that the terminal of each user allows the performing fault diagnosis for the service.

7. The method according to claim 5, wherein determining, through the information fed back by the terminal of each user that the terminal of the user allows performing the fault diagnosis for the service comprises:
when the terminal of each user dials a specific operation and maintenance number, determining that the terminal of each user allows performing the fault diagnosis for the service.

8. The method according to claim 5, wherein determining, through the information fed back by the terminal of each user that the terminal of the user allows performing the fault diagnosis for the service comprises:
when the terminal of each user holds a call for a specified duration, determining that the terminal of each user allows performing fault diagnosis for the service.

9. The method according to claim 1, wherein the performing fault diagnosis for the service comprises:
performing fault diagnosis for the service in a current or a next service process.

10. A fault diagnosis apparatus, wherein a service diagnosed by the apparatus relates to at least one user, the apparatus comprising:
a processor and a memory coupled to the processor;
wherein the processor is configured to
determine, through a system-side authority list, that the system side allows performing the fault diagnosis for the service of each user, wherein the system-side authority list comprises at least an identifier of each user, a service of each user and information about whether the system side allows performing the fault diagnosis for each service of the user; and
perform the fault diagnosis for the service after determining that the terminal of each user allows performing the fault diagnosis for the service.

11. The apparatus according to claim 10, wherein:
the processor performs the fault diagnosis for the service after the processor determines that both the terminal of each user and the system side allow performing the fault diagnosis for the service.

12. The apparatus according to claim 10, wherein the processor is configured to:
determine, through information fed back by the terminal of each user, that the terminal of the user allows performing the fault diagnosis for the service.

13. The apparatus according to claim 12, wherein the processor is configured to determine that the terminal of each user allows performing the fault diagnosis for the service, based on one of the following situations:
(a) when the terminal of each user dials a specific dual tone multi frequency (DTMF) number,
(b) when the terminal of each user dials a specific operation and maintenance number, and
(c) when the terminal of each user holds a call for a specified duration.

14. The apparatus according to claim 10, further comprising:
a sender, configured to, when the terminal of any user does not allow performing the fault diagnosis for the service, send an authorization request to the terminal of the any user to request to allow performing the fault diagnosis for the service; wherein
the processor is configured to:
perform the fault diagnosis for the service after it is determined that the terminal of the any user allows performing the fault diagnosis for the service.

15. The apparatus according to claim 10, wherein the processor is configured to:
perform fault diagnosis for the service in a current or a next service process.

16. A fault diagnosis apparatus comprising a memory and a processor, wherein a service diagnosed by the fault diagnosis apparatus relates to at least one user,
the memory is configured to store executable code for implementing:
determining whether a terminal of each user allows performing fault diagnosis for the service;
sending an authorization request to any terminal determined to not allow performing the fault diagnosis for the service; and
performing the fault diagnosis for the service when the terminal of each user allows performing the fault diagnosis for the service; and
the processor is configured to execute the codes stored by the memory.

17. The apparatus according to claim 16,
the memory is configured to store executable code for implementing:
determining that a system side allows performing the fault diagnosis for the service, before performing the fault diagnosis for the service.

18. The method according to claim 17,
wherein determining that the system side allows performing the fault diagnosis for the service of each user comprises:
determining, through a system-side authority list, that the system side allows performing the fault diagnosis for the service of each user, wherein the system-side authority list comprises at least an identifier of each user, a service of each user, and information about whether the system side allows performing the fault diagnosis for each service of the user.

* * * * *